Patented Apr. 7, 1942

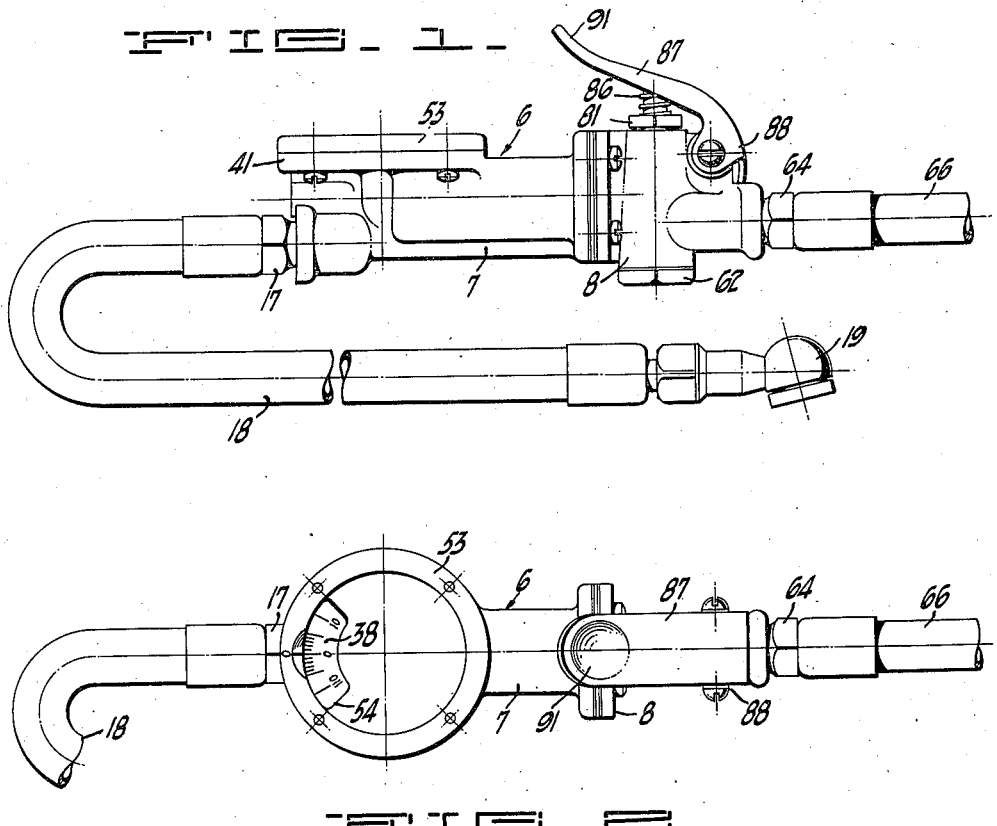

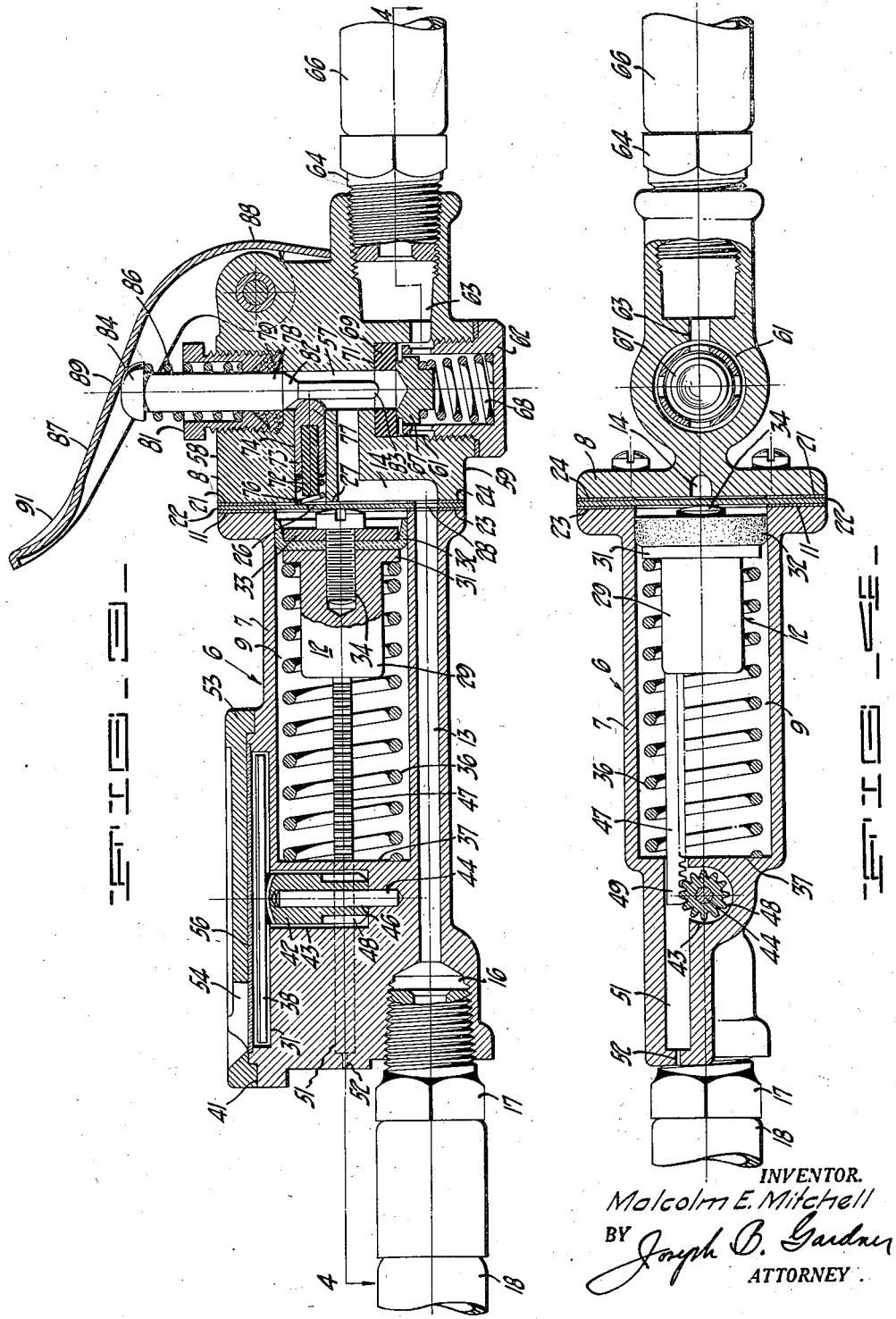

2,278,664

UNITED STATES PATENT OFFICE 2,278,664

AIR INFLATER MECHANISM

Malcolm E. Mitchell, Oakland, Calif., assignor of one-half to Manfred M. Weinberg, Oakland, Calif.

Application March 8, 1939, Serial No. 260,561

4 Claims. (Cl. 137—69.5)

The invention relates to an air inflater mechanism such as commonly used in service stations, garages and the like for inflating pneumatic tires and other objects, and which provides for the inflation or air charging of such objects and also for the gauging of the air pressure contained therein.

In inflater mechanisms of the character described a relatively great variation of air pressure is used in the various types of tires to be inflated and consequently, a rather large variation in gauge pressure reading is required. Gauges for this purpose are commonly calibrated for reading of gauge pressures from zero to approximately one hundred and ten pounds per square inch, and in order to obtain intermediate gauge readings of substantial accuracy a rather large displacement of the calibrated gauge element is required. Heretofore, the calibrated gauge element has been directly connected to a pressure responsive displaceable means such as a reciprocating piston contained within a pressure cylinder for displacement of the gauge element, and the movement of the piston has been made responsive and proportional to the air pressure applied to the cylinder by means of a spring or the like connected to and resisting the movement of the piston. Accordingly, a relatively large movement of the piston and correspondingly large movement of the compression spring was required in order to obtain a sufficient displacement of the gauge reading element to obtain satisfactory and accurate pressure readings. As a result of the requirement of relatively large movements in the above parts, the inflater mechanism has been constructed of considerable size and the piston spring has had to be made of relatively large length and even then some distortion of the spring and attendant inaccuracy of the gauge was difficult, if not impossible to eliminate. Also, in order to obtain a greater movement of the gauge element at the lower intermediate pressures most commonly used, a multiple spring arrangement for resisting the movement of the piston has been frequently resorted to in order to increase the resilient resistance to movement of the piston at the higher pressure readings and to correspondingly reduce the resilient resistance to movement of the piston at the lower gauge readings in order to obtain a greater movement of the piston in the latter mentioned pressure range than in the former. In accordance with the present invention and as a principal object thereof, I have provided an air inflater mechanism of the character described wherein a greatly enlarged movement of the calibrated gauge reading element is obtained for a very much shorter displacement of the piston than has been heretofore obtained. By reason of the shortening of the piston movement and corresponding shortening of the compression of the resisting spring, substantially all distortion of the spring and non-linear movement thereof under applied compression force, is eliminated and at the same time the relatively short movement of the piston throughout the pressure range is multiplied into a very greatly expanded movement of the gauge reading element, whereby the latter may be accurately calibrated to intervals of pressure readings of one pound per square inch or less, instead of pressure reading intervals of two to five pounds per square inch, heretofore provided, with the result that a pressure reading may be taken with greater precision and also with considerably less eye-strain than heretofore.

Another object of the invention is to provide an inflater mechanism of the character described which is constructed of a substantially reduced number of parts and designed for substantially simpler and cheaper manufacture than air inflater mechanisms heretofore obtained.

A further object of the invention is to provide an air inflater mechanism of the character above set forth wherein various of the inflater elements are improved from the standpoints of construction, function and operation, than equivalent operating elements of previous inflaters.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation of an air inflater mechanism constructed in accordance with the present invention.

Figure 2 is a plan view of the inflater mechanism illustrated in Figure 1.

Figure 3 is an enlarged vertical sectional view of the inflater.

Figure 4 is a plan sectional view of the inflater taken substantially on the plane of line 4—4 of Figure 3, and of the same enlarged scale as in Figure 3.

The air inflater mechanism of the present invention and as depicted in the accompanying drawings, comprises a body 6 which may be conveniently formed of a pair of casings 7 and 8 secured together in endwise abutting relation and providing the gauge and valve mechanisms respectively of the inflater. The casing 7 is formed with an interior cylinder 9 opening to an end 11 of the casing, and mounted within the cylinder for longitudinal reciprocation therein is a pressure responsive piston 12. The casing 7 is also provided with a passage 13 extending longitudinally therethrough and which forms part of the air discharge passage for the inflater mechanism and which extends to the end 11 of the casing and there registers with an end portion of a passage 14 in the casing 8. The opposite end 16 of the passage 13 preferably opens into a threaded socket which is arranged for the receipt of a fitting 17 on an air hose 18 leading to a chuck 19 adapted for attachment to the valve stem of a tire or the like (not shown). Mounted between the end 11 of the casing 7 and the abutting end 21 of the casing 8 is a flat disc-like plate 22 which is sealed in position by means of gaskets 23 and 24 to seal off the end of the cylinder 9. An opening 26 is provided in the plate 22 and is communicated to the passage 14 by means of a passage 27 so as to admit air under pressure into the cylinder for gauging. The plate 22 and gaskets 23 and 24 are provided with a common open portion 28 aligned with the passages 13 and 14 for communicating these passages at the abutting ends of the casing.

The piston 12 as here shown consists of a cylindrical body 29 having an enlarged circular head end 31 against which is secured a cup-shaped sealing washer 32 which extends across the cylinder and seals the piston in the cylinder. A reinforcing disc 33 is mounted within the cup-shaped washer 32 for holding the latter in engagement against the cylinder side wall and the disc and washer are secured to the piston by means of a screw 34 extending centrally through the disc and washer and threaded into the body of the piston. In accordance with the present invention I prefer to construct the cup-shaped washer 32 of leather and the reinforcing disc 33 of felt. I have found that the use of the felt reinforcing disc in combination with the leather sealing washer, is extremely effective to seal the piston in the cylinder under all operating conditions and to afford an appropriate amount of elasticity and expansion force against the cylinder side wall and to effectively and substantially permanently resist the deteriorating effect of oil or water which may deposit on the sealing members.

The movement of the piston is rendered responsive and proportional to the amount of applied pressure by means of a spring 36, here shown of helical form, and compressed between the enlargement 31 on the piston and an opposite end 37 of the cylinder.

As an important feature of the present invention I provide a gauge reading element in the form of a circular disc 38 which is here mounted in a cylindrical recess 39 in a side face 41 of the casing 7. The assembly is such as to position the plane of the disc 38 substantially parallel to the longitudinal axis of the cylinder 9 and the disc 38 is provided with an axially extending hub shaft 42 which is mounted in a transverse cylindrical opening 43 in the casing and which is here rotatably supported by means of a trunnion 44 fixed in the body of the casing centrally of the bore 43 and journaled in a central bore 46 in the hub shaft. As will be seen from Figures 3 and 4, the axis of the shaft 42 is arranged at substantially right angles to the axis of the cylinder 9.

In accordance with the present invention, the disc 38 is formed of a diameter providing a peripheral portion of greater length than the length of movement of the piston 12 and appropriate drive means is interposed between the piston and the disc for causing a rotation of the disc upon reciprocation of the piston and providing an amplified movement of the peripheral portion of the disc relative to the movement of the piston. As here shown, such drive means consists of a rack 47 carried by and extending longitudinally from the piston 12 and which engages pinion teeth 48 provided on the hub shaft 42. By selecting the pinion having a pitch circle equal in length to the over-all movement of the piston 12, a complete revolution of the disc may be obtained for a full movement of the piston under all applied air pressures. Preferably, the gear ratio between the rack and pinion is such that a complete revolution of the disc may be obtained with a relatively short movement of the piston. In this manner, the spring 36 is subjected to a minimum amount of compression and consequently is not subjected to distortion and will properly maintain its linear coefficient of compression, thereby enabling a uniform increment of movement of the gauge disc for a uniform increment change of pressure. Also by reason of the provision of a relatively long movement of the gauge reading element, a precise calibration of pressure readings may be provided on the element and pressure readings obtained which are accurate to within one pound or less rather than relying on intervals of between two to five pounds in inflaters heretofore used.

The rack as here shown is supported at its distal end 49 in a guide 51 formed in the casing 7 and the latter may be conveniently vented to the atmosphere as through opening 52 in order to allow for the introduction and discharge of air into the cylinder 9 in accordance with the displacement of the piston 12.

Mounted over the gauge recess 39, is a cover plate 53 which as here shown, is preferably provided with an opening 54 through a peripheral portion thereof for viewing the upper calibrated surface of the gauge disc 38. Preferably, a sheet of transparent material 56 is interposed between the cover plate 53 and the wide wall of the casing over the gauge recess in order to prevent dust or other foreign material from gaining access to the gauge mechanism. Desirably, and as here shown, the member 56 is of circular form, whereby at periodic intervals the cover plate 53 may be removed and the member 56 rotated to change the exposed portion in the window 54. Preferably, the member 56 is formed of a flexible sheet material such as mica, isinglass, "pyrolin" or the like in order to minimize breakage and such materials are frequently subject to discoloration after long exposure, and hence the desirability of the feature of changing the exposed peripheral portion of the transparent member.

The casing 8 is provided with an internal chamber 57 here shown in the form of a transverse bore extending through the member to the opposite sides 58 and 59 of the casing. The portion of the chamber extending to side 59 is in the form of an enlargement 61 which is closed at the end of the passage by means of a nut 62. Opening into the enlargement 61 is an inlet passage 63 adapted for connection as by means of fitting 64 and hose 66 to a source of air under pressure. Mounted in the enlargement 61 is a valve 67 which is normally urged by means of spring 68 compressed between the valve and the nut 62 into engagement with a valve washer 69 mounted against the inner end 71 concentric with the chamber 57. In this manner the tension of spring 68, together with the force of compressed air acting upon the outer side of valve 67, act to normally seat the valve against the washer 69 and seal off communication of the inlet passage 63 with the chamber 57. Mounted at right angles to the axis of the chamber 57 and reciprocally mounted for movement into and from an engaged position with the opening 26 in plate 22 is a compressible valve member 72. As here shown, this member is mounted in a cylindrical shape carriage 73 slidably carried in a bore 74 extending from the opening 26 to the chamber 57. The carriage 73 is normally urged away from the plate to retract the valve member 72 from the opening 26, by means of a small helical spring 76 mounted between the plate and one end of the carriage. In such position the opposite end 77 of the carriage extends into the chamber 57 for engagement by a manually operated member 78. As here shown, this latter member is in the form of a pin which extends axially through the chamber 57 to the outer side 58 of the casing and is sealed in the chamber by means of a packing gland 79 surrounding the pin and held in place by means of a jamb nut 81. The pin 78 is provided with an annular beveled shoulder 82 which upon longitudinal displacement of the pin is adapted to engage with the end 77 of the gauge valve carriage, which latter end is preferably rounded or beveled for the purpose, to urge the carriage laterally towards the plate to compress the valve 72 against the plate opening 26. Upon further longitudinal movement of the pin, the inner end 83 thereof engages and unseats valve 67 to thereby place the inlet and discharge passages of the inflater in communication. In this manner the gauge passage is positively sealed off prior to the admitting of compressed air from the source into the discharge passage and conversely upon movement of the pin in an opposite direction, the valve 67 is seated prior to an opening of valve 72. This is here effected by forming the pin 57 of an enlarged diameter between the shoulder 82 and the outer end 84, so that after the carriage 73 is laterally displaced by the shoulder, the same will be held in displaced position by the enlarged portion of the pin.

The actuating member 78 is normally held in outwardly extended position, that is one disengaging both of the valves by means of a helical spring 86 compressed between the head end 84 of the stem and a seat provided for the jamb nut 81. The member 78 is here conveniently moved to an inwardly displaced position by means of a manually engaged handle 87 which is pivoted adjacent one end 88 to the handle and bears against the head end 84 of the pin at an intermediate portion 89 of the handle length. In normal operation of the inflater the handle may be conveniently gripped adjacent the outer end 91 thereof by engagement of the operator's hand around the handle and the body of the inflater.

The operation of the device, as will be clear from the foregoing, is as follows: Upon downward movement of the handle as viewed in Figure 3, to displace the actuating pin 82, the valve 72 is moved laterally to engage the plate opening 26 to thereby close off communication of the discharge of the mechanism with the gauge. Upon further displacement of the handle, the lower end 83 of the pin engages and unseats valve 67 to thereby establish communication between the inlet passage 63 and the discharge passage 13 of the inflater to pass air under pressure into the tire or other object being inflated or charged. Upon return movement of the handle, the valve 67 is first seated to thereby close off the inlet passage and upon further retraction of the handle and pin, the valve 72 is released for movement away from the opening 26, thereby spacing the gauge cylinder in communication with the discharge passage 13 for gauging of the pressure in the inflated object.

It will also be clear from the foregoing that the inflater mechanism is constructed of a minimum number of simply constructed parts, whereby the mechanism will give long and satisfactory service and may also be manufactured with greater simplicity and at less cost than other inflater mechanisms heretofore available. For example, the parts of the inflater body such as casings 7 and 8 and also the cover plate 53, may be die-cast, while the various valve and other parts readily adapt themselves for mass production by screw-machine or punch-press operations.

I claim:

1. An air inflater mechanism comprising, a casing provided with a cylinder therein opening to one end of said casing, pressure responsive means mounted in said cylinder, a gauge member connected to and displaced by said means, a second casing having one end thereof secured to said first casing end, a plate interposed and clamped between said casing ends and provided with an air opening registering with said cylinder, said second casing being provided with inlet and discharge passages connected to a source of air under pressure and to a tire or the like to be inflated and being provided with a passage communicating said discharge passage with said plate opening, valve means normally positioned to close said inlet passage and to communicate said discharge passage with said third named passage communicating said opening and being manually displaceable to establish communication between said inlet and discharge passages, and means connected to said valve means and movable upon displacement of the latter to engage said plate at said plate opening to close said plate opening.

2. An air inflater mechanism comprising, a casing provided with a cylinder therein opening to one end of said casing, pressure responsive means mounted in said cylinder, a gauge member connected to and displaced by said means, a second casing having one end thereof secured to said first casing end, a plate interposed and clamped between said casing ends and provided with an air opening registering with said cylinder, said second casing being provided with an interior chamber and formed with inlet and discharge passages connected to said chamber and adapted for connection to a source of air under pressure and to a tire or the like to be inflated and provided with a passage connected with said discharge passage with said plate opening, a valve mounted in said chamber adjacent said inlet passage and normally positioned to close off communication of said inlet passage with said chamber, a valve reciprocally carried by said second casing for movement to and from an engaged position with said plate at said plate opening to close said opening and being normally held spaced from said opening, and a manually engageable actuating member mounted in said chamber and movable to unseat said first valve and to displace said second valve into engagement with said plate to close said opening and providing a seating of said second valve prior to an unseating of said first valve.

3. In an air inflater mechanism including a plurality of connected casings housing gauge and manually operated valve mechanisms and joined together with an air passage in each registering with the other at the joined faces of said casings, a plate mounted between said faces and having an aperture connecting said passages, and a closure member reciprocally carried by one of said casings for movement to and from said plate to close and open said aperture and being connected to said valve mechanism for actuation therewith.

4. In an air inflater mechanism including a plurality of connected casings housing gauge and manually operated reciprocating valve mechanisms and wherein said valve casing is provided with passages adapted for connection to a source of air under pressure and a tire or the like to be inflated and said valve mechanism is adapted to open and close said source passage and wherein said casings are formed with gauge passages connected together at the joining faces of said casing, a plate mounted and sealed between said faces and having an aperture registering with said gauge passages, and a member mounted for reciprocation in said valve casing for movement to and from said plate perpendicular thereto to close and open said aperture and being connected to said valve mechanism for actuation therewith and to close said aperture prior to opening of said source passage upon movement of said valve mechanism in one direction and to open said aperture after closing of said source passage upon return movement of said valve mechanism.

MALCOLM E. MITCHELL